United States Patent [19]

McFarland

[11] Patent Number: 4,601,447

[45] Date of Patent: Jul. 22, 1986

[54] CONDUIT SPACER ANCHORING SYSTEM

[75] Inventor: James H. McFarland, Leonard, Mich.

[73] Assignee: LOF Plastics Inc., Troy, Mich.

[21] Appl. No.: 665,968

[22] Filed: Oct. 29, 1984

[51] Int. Cl.[4] ............................................. F16L 3/22
[52] U.S. Cl. ..................... 248/49; 248/68.1; 52/678
[58] Field of Search .............. 248/558, 530, 532, 533, 248/49, 65, 68.1, 156, 500, 507, 508, 413; 403/389, 391; 52/678, 687, 126.2

[56] References Cited

U.S. PATENT DOCUMENTS

| | | | |
|---|---|---|---|
| D. 257,221 | 10/1980 | Piesner | 248/68.1 |
| 1,308,630 | 7/1919 | Hatch | 248/156 |
| 1,852,673 | 4/1932 | Pilj | 52/678 |
| 2,584,015 | 1/1952 | Hawes | 248/413 |
| 2,766,660 | 10/1956 | Laddon | 248/49 |
| 3,105,510 | 10/1963 | Demosthenes | 403/391 |
| 3,568,455 | 3/1971 | McLaughlin | 248/49 |
| 3,856,246 | 12/1974 | Sinko | 248/68.1 |
| 4,085,559 | 4/1978 | Ilukowicz | 52/687 |
| 4,183,484 | 1/1980 | Mathews | 248/68.1 |
| 4,306,697 | 12/1981 | Mathews | 248/68.1 |

FOREIGN PATENT DOCUMENTS

| | | | |
|---|---|---|---|
| 1185492 | 3/1970 | United Kingdom | 52/678 |
| 1525708 | 9/1978 | United Kingdom | 52/687 |

Primary Examiner—J. Franklin Foss
Assistant Examiner—Robert A. Olson
Attorney, Agent, or Firm—Phillip S. Oberlin

[57] ABSTRACT

A system for anchoring the conduit spacers of a utility duct bank in a fixed position within a trench during encasement or burial of the duct bank. The conduit spacers comprise components having mating bosses by means of which they can be horizontally and vertically interlocked. A holder interfits with the horizontal or side attachment bosses and includes a vertical guide opening for receiving a length of steel reinforcing bar or other elongated member. The length of reinforcing bar is inserted through at least one, and preferably two or more aligned and driven into the earth forming the floor of the trench, and the top portion of the bar is secured as by being bent over the upper holder to prevent the duct bank from shifting or floating upwardly as when concrete is poured around it. The shape of the holders is such that a tapered notch is created between the conduit spacer and holder fitted thereto for receiving a horizontally extending reinforcing rod to provide added strength to the duct bank.

13 Claims, 5 Drawing Figures

CONDUIT SPACER ANCHORING SYSTEM

BACKGROUND OF THE INVENTION

1. Field of the Invention

The present invention pertains generally to a system of interlocking modular conduit spacers for holding banks of utility ducts or conduits in parallel spaced relationship, and more particularly to a component for attachment to the modular spacers for anchoring a utility duct bank in a fixed position in the bottom of a trench within which it is installed while it is being encased in concrete or otherwise buried in the earth.

2. Description of the Prior Art

Utility lines such as electric power lines and telephone lines which are to be laid underground are commonly installed within pipes or conduits buried beneath the earth's surface. The pipes or conduits are laid in trenches excavated in the earth, with the trenches then being backfilled with an appropriate material, generally earth or poured concrete, to firmly encase the pipes or conduits and permit loads to be carried thereover. It is desirable for the pipes or conduits to maintain a spaced parallel relationship and remain in a fixed position as they are buried or encased in concrete. To that end, the pipes or conduits are generally supported within the trench in banks or bundles by a supporting framework comprised of interconnected modular spacers as shown for example in U.S. Pat. No. 3,856,246. The pipes or conduits are thus maintained in the desired spatial relationship within the trench pending backfilling, and they maintain their spaced parallel positions with adequate space therebetween to permit the filling material or concrete to flow around and completely fill the space between the pipes or conduits as the trench is filled. As the filling material is initially placed in the trench it tends to displace or move the bank of pipes or conduits until sufficient material has been deposited to secure them in place. When the filling material is poured concrete an additional problem is encountered in that the relatively lightweight, hollow pipes or conduits tend to be buoyed upwardly or floated by the newly poured fluid concrete. A number of devices have been proposed to anchor the duct bank within the trench and insure that it will remain stationary and in the proper position within the trench while being buried or encased in concrete. Thus, some spacers have been provided with hollow corner posts through which vertical reinforcing bars are inserted and driven into the floor of the trench. The base or platform of the spacers of the aformentioned U.S. Pat. No. 3,856,246 is provided with holes through which a rod can similarly be inserted and driven into the ground in the floor of the trench. Still other devices for this purpose have included wooden or metal T's and forks engaged over portions of the spacers and driven into the floor of the trench.

None of the aforementioned devices has proven entirely satisfactory in anchoring a utility duct bank to the bottom of the trench so that it will remain in a fixed position while being encased in concrete or otherwise buried in the earth. Thus, the prior art devices do not provide the desired stability throughout the height of the duct bank nor permit flexibility in locating the devices at various positions where they may be needed. In some of the devices the metallic anchoring rods are positioned immediately adjacent the pipe or conduit so as to constitute objectionable electromagnetic interference with the high capacity conductors within the conduit.

SUMMARY OF THE INVENTION

In accordance with the present invention there is provided an improved system for conveniently anchoring a utility duct bank to the bottom of a trench within which it is to be buried or encased in concrete. The pipes or conduits are carried in modular spacer components adapted to interfit with one another so as to assemble the desired number of pipes or conduits in spaced parallel relationship, side-by-side and one above another as an integral duct bank. The modular spacer components have mating attachment bosses along either side by means of which they may be interconnected in side-by-side relationship. A small holder component is provided with mating male and female bosses on either side which are adapted to be received in a mating attachment boss on the modular spacer component. The holder component has a vertical guide opening therethrough adapted to accept a rod-like member such as a length of steel reinforcing bar. The bar is guided through at least one, and preferably two or more, of the holders and driven into the earth defining the floor of the trench. The top portion of the bar is secured above the top holder, as by being bent over, to prevent the duct bank from floating upwardly as concrete is poured around it. The holders are designed so that horizontal reinforcing rods may be installed in a tapered notch formed at the junctions of the holders with the modular spacer components for adding strength to the duct bank. Locking collars may also be provided on the vertical bars beneath the holders for supporting the duct bank or a portion thereof at any desired height above the floor of the trench so that concrete or other fill material may flow in and fill the space beneath the duct bank.

It is therefore an object of the invention to provide a means for anchoring a utility duct bank within a trench which is inexpensive to manufacture and cost-efficient in use.

Another object of the invention is to provide such an anchoring means which can be readily attached to the side of the duct spacer system at several intermediate heights to provide stability to the duct bank.

Another object of the invention is to provide such an anchoring means which can be located between spacers within the duct bank to provide added interior stability within the bank.

Still another object is to provide an anchoring means wherein the vertical anchoring rods are spaced from the pipes or conduits of the duct bank so as to minimize electromagnetic interference with the electrical conductors carried therein.

Yet another object of the invention is to provide such an anchoring means which will receive both vertically extending anchoring bars and horizontally extending reinforcing bars.

Other objects and advantages will become more apparent during the course of the following description when taken in connection with the accompanying drawings.

BRIEF DESCRIPTION OF THE DRAWINGS

In the drawings, wherein like numerals are employed to designate like or equivalent parts throughout the same.

DESCRIPTION OF THE PREFERRED EMBODIMENTS

Figure 1:
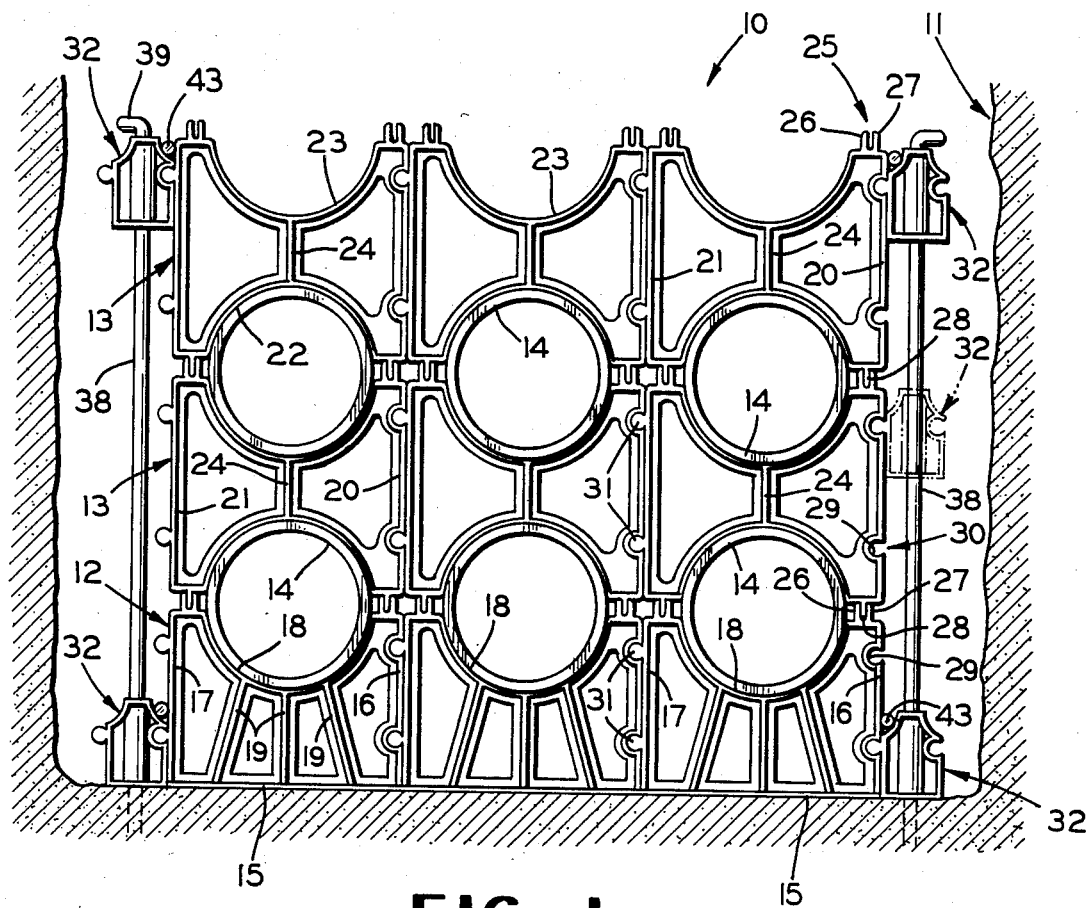
FIG. 1 is an end view illustrating a duct bank comprised of pipes or conduits carried in modular spacers and anchored within a trench in accordance with the invention.

With reference now to the drawings, and in particular to FIG. 1, there is shown generally at 10 a duct bank installed in an excavated trench 11 preparatory to being covered with backfill material or encased in concrete as anticipated conditions of subsequent use may dictate. More particularly, the duct bank comprises a framework built up of a plurality of interlocked spacer elements comprised of two standard modular units, a base unit 12 and an intermediate unit 13, which are assembled and interlocked together to form a support and clamping network for a plurality of pipes or conduits 14. As will be readily apparent, the modular units 12 and 13 may be assembled in any combination horizontally and vertically to accommodate the desired number of pipes or conduits 14.

As disclosed in the aforementioned U.S. Pat. No. 3,856,246, the modular units may advantageously be molded of a plastic material such as a high impact styrene resin, ABS resin, acrylate resin, vinyl or polypropylene, or they may be a lightweight cast metal such as aluminum. The base unit 12 is of open, generally rectangular form and includes a planar base 15 and opposite side members 16 and 17. A top member 18 interconnecting the side members 16 and 17 is recessed or curved to form a saddle having a configuration complementary to the pipes or conduits 14 to be supported therein. Support posts 19 interconnect the curved top member 18 and the base 15 to provide added support for the top member.

The intermediate modular unit 13 is generally similar in construction to the base unit except that in place of the planar base member it has a member conforming generally to the outline of the pipes or conduits. Thus, the unit 13 includes opposite side members 20 and 21 interconnected at the bottom by an upwardly curved lower cross member 22 and at the top by a downwardly curved top cross member 23, both the lower member 22 and the top member 23 having a configuration complementary to the pipes or conduits 14 to be supported or clamped within the modular units. A strut 24 extends between the lower and top cross members 22 and 23 to provide rigidity and added strength to the modular units.

In order to permit assembly of the individual modular units in stacked, superimposed relationship, they are provided with mating fastening devices which can be quickly and easily coupled to securely interlock the units. To that end the base unit 12 is provided at the ends of the top member 18 with bifurcated lugs 25 adapted to receive between spaced legs 26 and 27 thereof mating prongs 28 integrally formed at the ends of the lower cross member 22 of the intermediate unit 13. The intermediate unit 13 likewise has the bifurcated lugs 25 integrally formed at the ends of the upper cross member 22. The spaced legs 26 and 27 and the prongs 28 have complementary ridges and recesses formed on their opposed surfaces whereby the prongs are gripped between the legs to maintain the modular units in interlocked relationship. It will thus be appreciated that modular intermediate units 13 may be stacked one upon another above a base unit 12 to accommodate the desired number of pipes or conduits 14 in superimposed relationship.

For purposes of laterally interconnecting the base and intermediate modular units 12 and 13 to accommodate a plurality of the pipes or conduits 14 in spaced, side-by-side relationship, as well as to accommodate the anchoring devices of the invention as will be hereinafter described, the units are provided along their vertical sides with mating bosses or connectors. Thus, both the base units and the intermediate units have formed along the outer margin of their one side member 16 or 20, respectively, spaced pairs of recesses 29 having throat openings 30 of reduced width. Their other side members 17 and 21, respectively, have formed thereon corresponding elongated bulbous projections 31 adapted to be slidingly received within the mating recesses 29 of an adjacent base unit 12 or intermediate unit 13 for laterally interconnecting the units.

Figure 3:
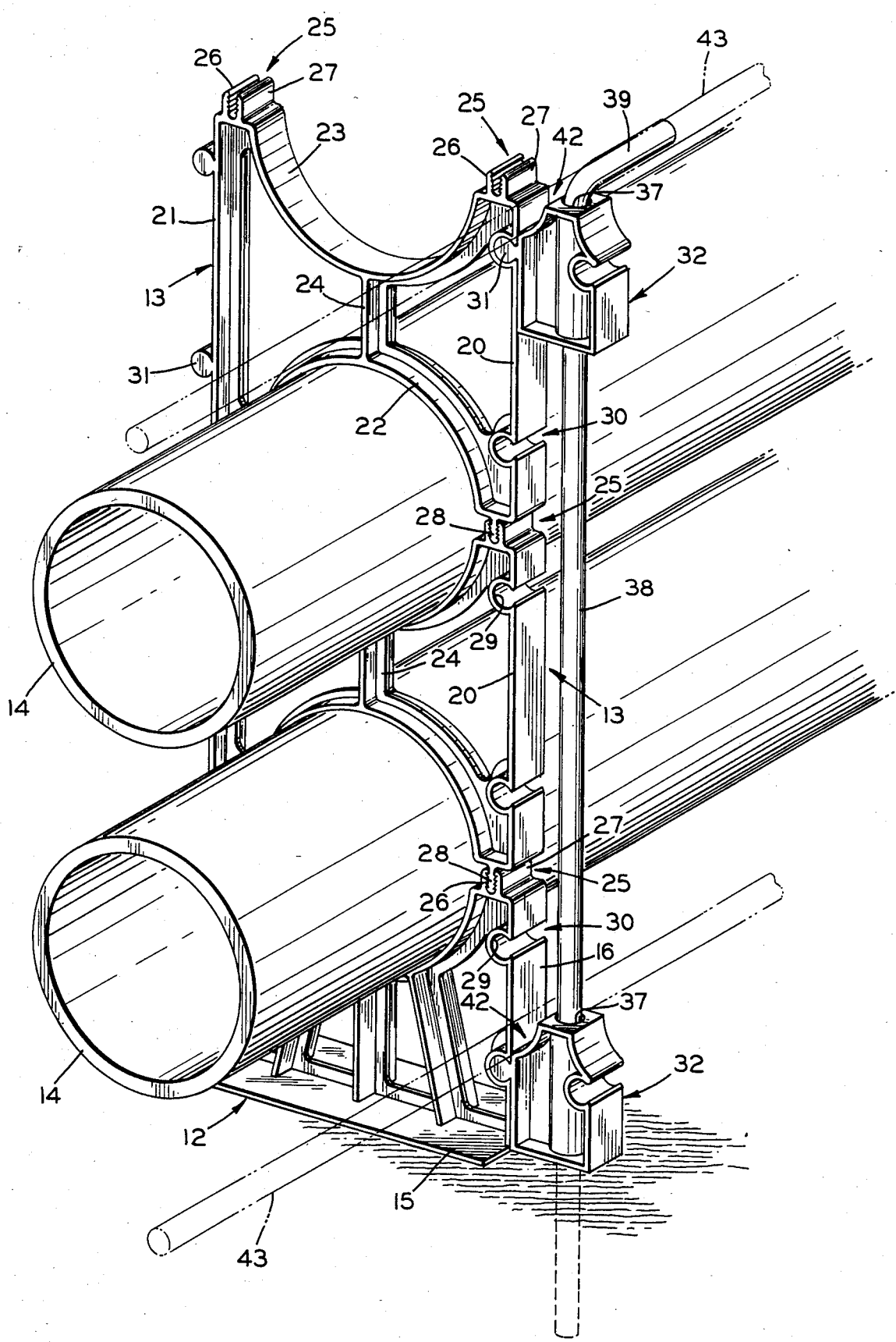
FIG. 3 is an enlarged perspective view of a portion of a duct bank formed by pipes or conduits carried in modular spacers and employing the anchoring holder of the invention.

It will thus be apparent that the base unit 12 and intermediate units 13 may be assembled in suitable combinations as shown, for example, in FIGS. 1 and 3 to comprise a duct bank having the required number of pipes or conduits 14 for any particular installation. The duct bank may either be assembled on the surface and then deposited in the trench, or assembled directly within the trench. In any event the assembled duct bank will permit relatively free flow of back fill material or poured concrete around and into the spaces between the spaced pipes or conduits comprising the duct bank.

Figure 2:
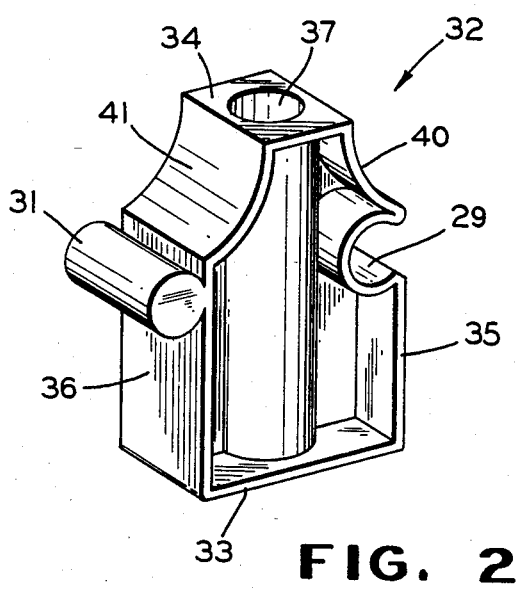
FIG. 2 is a perspective view of the novel anchor rod holder of the invention.

As hereinafter discussed, it is necessary that the assembled duct bank 10 be securely anchored within the trench 11 to prevent shifting during backfilling of the trench with granular material or buoyant upward movement as the bank is immersed in poured concrete. To that end there is provided in accordance with the invention, as best shown in FIGS. 2 and 3, a holder adapted for ready attachment to the modular base units 12 and intermediate units 13. More particularly the holder, designated in its entirety at 32, is preferably a one-piece molded body unit similar in fabrication and composition to the units 12 and 13, and having a generally rectangular configuration including a bottom wall 33, top wall 34 and opposite side walls 35 and 36. In order to permit the holder to be readily and securely affixed to the units 12 and 13 at selected locations, the side wall 35 is formed with one of the recesses 29 and the side wall 36 is formed with one of the elongated bulbous projections 31. Thus, the holder 32 may be attached at any position along either side of the base units 12 and intermediate units 13 by simply orienting it in the proper direction and coupling the recess 29 or the projection 31, as the case may be, to a corresponding mating projection or recess on the modular unit.

Extending longitudinally through the holder 32 is an opening 37 having a diameter adequate to freely permit passage therethrough of a rod-like member such as the ⅜ inch (9.5 mm) and ½ inch (12.7 mm) diameter concrete reinforcing bars commonly employed in such construction projects. The openings 37 in the holders 32 affixed along the side of an assembly of the modular units 12 and 13 will thus be axially aligned so as to easily permit insertion therethrough of a rod or bar 38 such as, for example, a length of the aforementioned concrete reinforcing bars. As shown in FIGS. 1 and 3, the lower extremity of the rod is driven into the earth in the bottom of the trench 11, and the upper extremity is bent over as at 39 above the top holder 32. Alternatively, other suitable securing means (not shown) may be provided on the anchoring rod for preventing upward movement of the holder 32, and thus the duct bank 10, relative to the anchoring rod or bar 38. The anchoring rod and the holders thus stabilize the duct bank against both lateral and vertical movement.

Figure 4:
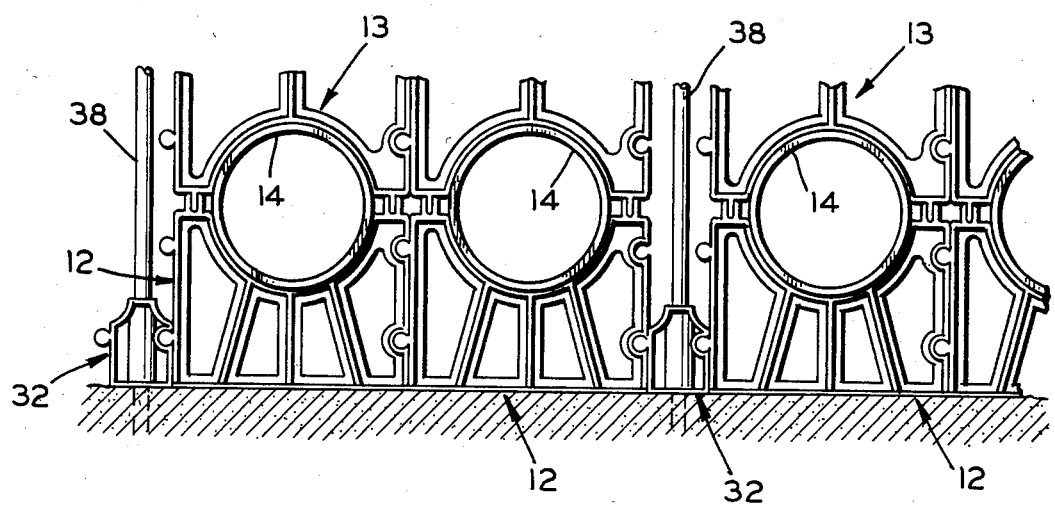
FIG. 4 is an end view of a portion of a duct bank illustrating use of the holder within the interior of the duct bank assembly as well as at the edge.

In some instances where the duct bank is encased in concrete, longitudinally extending reinforcing bars are desirable within the bank to provide added strength to the structure. The holders 32 of the present invention are particularly adapted to accommmodate such reinforcing bars. As will be apparent in FIGS. 1 and 3, the holder is designed so that the upper region of the side walls 35 and 26, above the recess 29 and the projection 31, curve inwardly and upwardly as arcuate segments 40 and 41, respectively, to their juncture with the top wall 14. Thus, as illustrated in FIGS. 1 and 3, when the holders 32 are affixed to the modular units 12 or 13, the arcuate segments 40 and 41 form with an adjacent side member 16, 17, 20 or 21, a tapered notch or recess 42. As will be readily appreciated, interlocked modular support units 12 and 13 will be located at spaced intervals longitudinally along the duct bank, and thus the recesses 42 in successive support units will serve to support reinforcing bars 43 extending longitudinally along the duct bank.

Where the duct bank is comprised of several pipes or conduits 14 positioned side by side within modular clamping units, it may be desirable to anchor the bank within the interior of the assembly as well as at the edges. To this end there is shown in FIG. 4 an embodiment wherein adjacent base units 12 are separated by and connected to opposite sides of a holder 32. An additional holder 32 (not shown) is similarly situated between the intermediate units 13 above and in alignment with the lower holder, with a rod or bar 38 extending through the aligned holders and into the floor of the trench as hereinabove described for anchoring the duct bank.

Figure 5:
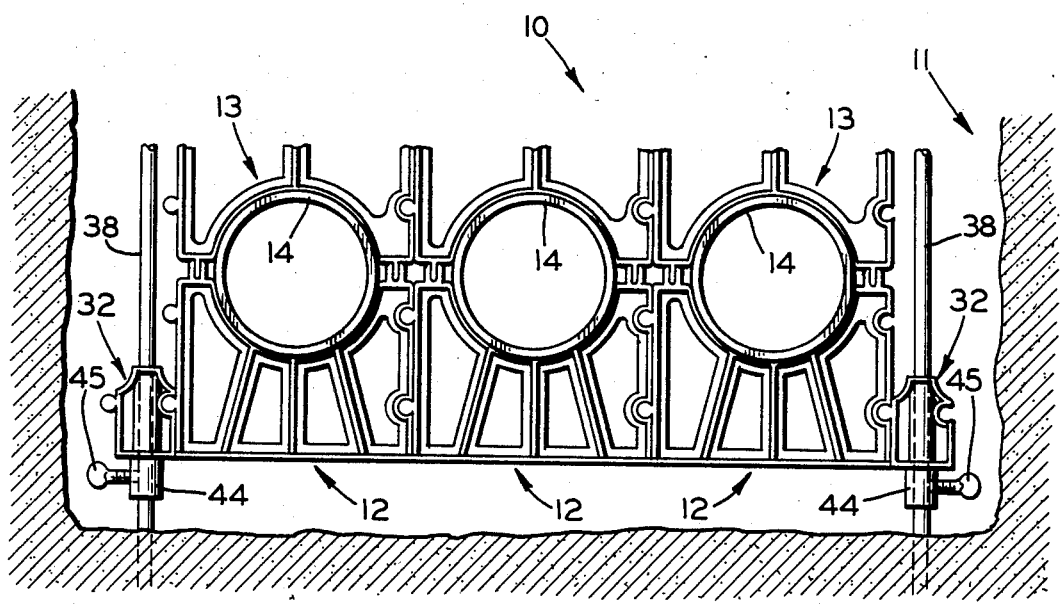
FIG. 5 is an end view of a portion of a duct bank illustrating the use of collars on the anchoring rods in conjunction with the holders for supporting the duct bank above the floor of the trench.

In certain instances it may be desirable to assemble the pipes or conduits into a duct bank with nonstandard vertical spacing between the conduits or to support the modular base units 12 above the floor of the trench. Such a situation may arise, for example, where high capacity electrical conductors are to be carried within the conduits. In that event additional concrete may be required around the conduits for added protection and to serve as a heat sink for the higher operating temperatures. As shown in FIG. 5, collars 44 may thus be slipped over the rods or bars 38 and locked in appropriate positions therealong as by thumbscrews 45 so that the holders 32 will rest thereon and support the duct bank at the desired elevation. While the collars have been illustrated beneath base units 12 and supporting the duct bank above the floor of the trench 11, it will be appreciated that the collars may also be likewise employed in supporting stacked pipes or conduits one above another with a spacing greater than that normally provided by the intermediate modular unit 13. It is also contemplated that the collars may be positioned above the holders 32 for securing the duct bank against upward movement, for example in place of the bent over portion 39 of the rod or bar.

Reviewing the invention briefly, a duct bank 10 may either be assembled and then laid in the trench 11, or the components may be assembled within the trench itself. In either event standard modular base and intermediate units 12 and 13 are employed in assembling pipes or conduits 14 in the desired configurations. Holders 32 are attached along the sides of the modular units 12 and 13, and with the duct bank properly positioned within the trench, rods 38 are inserted through the openings 37 of the holders and driven into the earth in the bottom of the trench. The rods may be cut to length and formed with the bent over end portions 39 prior to insertion, or they may first be inserted and driven and then have any excess removed and the end portion bent over. The number of holders 32 employed with each anchoring rod or bar 38 will depend, of course, upon the height of the duct bank, that is the number of conduits 14 positioned one above another. A single holder may be adequate for a bank comprised of a single row of pipes or conduits. For duct banks two or more conduits in height, it is preferred that at least two of the holders 32 be provided for each anchoring rod. For additional stability, intermediate holders may be employed as shown in broken lines in FIG. 1.

It will thus be apparent that the invention provides a simple, inexpensive and effective system for anchoring duct banks within trenches. Even though utilizing a relatively small number of standard parts, great flexibility is provided in the manner they may be assembled to achieve the desired results.

I claim:

1. A system for anchoring a utility duct bank within a trench comprising a framework of interlocked modular spacer units clampingly engaging therein at least one conduit member, each said modular unit having a pair of opposite side members, mating connectors on said opposite side members for laterally interconnecting a plurality of said modular units, a box-like holder of generally rectangular configuration relatively smaller than said modular units and having opposite side walls and planar top and bottom walls, connectors on said side walls adapted to interfit with said mating connectors on said side members for securing said holder to either side of said modular units, said holder extending outwardly beyond the side member of the modular unit to which it is secured, means defining a tubular opening extending entirely through said box-like holder along the longitudinal axis thereof, a rod-like member extending through said tubular opening in said holder and into the earth in the floor of said trench, and means preventing said holder from moving upwardly along said rod-like member.

2. A system for anchoring a utility duct bank within a trench as claimed in claim 1, including two of said holders located one above the other with their said openings axially aligned, said rod-like member extending through both of said holders.

3. A system for anchoring a utility duct bank within a trench as claimed in claim 1, including a plurality of said conduits positioned one above another by said modular spacer units, and a plurality of said holders spaced apart and secured to said modular spacer units along said side members with their said openings axially aligned, said rod-like member extending through said opening of each said holder.

4. A system for anchoring a utility duct bank within a trench as claimed in claim 3, wherein said rod-like member includes a portion bent over above the upper one of said holders, said bent-over portion comprising said means preventing said holder from moving upwardly along said rod-like member.

5. A system for anchoring a utility duct bank within a trench as claimed in claim 1, wherein said mating connectors comprise a recess in one member and a complementary bulbous projection on the other member adapted to be slidingly engaged in said recess.

6. A system for anchoring a utility duct bank within a trench as claimed in claim 1, wherein said opposite side walls of said holder include an inwardly tapering segment above said connectors, said inwardly tapering segment forming a notch with the adjacent side member of said modular unit to which it is secured.

7. A system for anchoring a utility duct bank within a trench as claimed in claim 6, including a reinforcing bar supported within said notch and extending longitudinally along said duct bank.

8. A system for anchoring a utility duct bank within a trench as claimed in claim 1, including a collar adjustably positioned on said rod-like member beneath said holder for supporting said duct bank at a selected elevation.

9. A system for anchoring a utility duct bank within a trench as claimed in claim 1, including a plurality of said conduits positioned side-by-side by said interlocked modular spacer units, and at least one of said holders secured to the outside side member of a modular spacer at each side of said duct bank.

10. A system for anchoring a utility duct bank within a trench as claimed in claim 9, wherein two of said modular spacer units are interconnected within the interior of said duct bank along their inside side members by at least one of said holders, with a said rod-like member extending through the said opening therein and into the earth beneath said trench.

11. A system for anchoring a utility duct bank within a trench as claimed in claim 1, wherein said duct bank comprises a plurality of said conduits positioned one above another and side-by-side by said modular spacer units, a plurality of said holders secured to the outside side members of said modular units at each side of said duct bank and positioned one above the other with their said openings axially aligned, one of said rod-like members extending through said aligned openings of each said plurality of holders.

12. A system for anchoring a utility duct bank within a trench as claimed in claim 11, wherein said mating connectors comprise a recess in one member and a complementary bulbous projection on the other member adapted to be slidingly engaged in said recess, said opposite side walls of said holder including an inwardly tapering segment above said connectors, said inwardly tapering segment forming a notch with the adjacent side member of said modular unit to which it is secured, and a reinforcing bar supported within said notch and extending longitudinally along said duct bank.

13. A system for anchoring a utility duct bank within a trench as claimed in claim 12, wherein adjacent pairs of said modular spacer units are interconnected along a vertical juncture within the interior of said duct bank along their inside side members by a plurality of vertically spaced holders, said openings of said holders being axially aligned, with a said rod-like member extending through the aligned openings and into the earth beneath said trench.

* * * * *